(12) United States Patent
Capers et al.

(10) Patent No.: US 9,071,989 B2
(45) Date of Patent: Jun. 30, 2015

(54) SYSTEM AND METHODS THAT ENABLE AUTOMATED TESTING OF MOBILE DEVICES AT A REMOTE MONITOR SITE

(75) Inventors: Walt Capers, Highland, MI (US); Priya Rajagopal, Ann Arbor, MI (US)

(73) Assignee: Dynatrace LLC, Detroit, MI (US)

( * ) Notice: Subject to any disclaimer, the term of this patent is extended or adjusted under 35 U.S.C. 154(b) by 801 days.

(21) Appl. No.: 13/363,447

(22) Filed: Feb. 1, 2012

(65) Prior Publication Data

US 2013/0196600 A1 Aug. 1, 2013

(51) Int. Cl.
*H04B 17/00* (2015.01)
*H04W 24/06* (2009.01)

(52) U.S. Cl.
CPC ..................... *H04W 24/06* (2013.01)

(58) Field of Classification Search
CPC ..................................................... H04W 24/06
USPC ............................................. 455/67.11, 41.2
See application file for complete search history.

(56) References Cited

U.S. PATENT DOCUMENTS 7,797,367 B1 * 9/2010 Gelvin et al. ................. 709/200
8,881,111 B1 * 11/2014 Smith et al. ................... 717/125

* cited by examiner

*Primary Examiner* — Eugene Yun
(74) *Attorney, Agent, or Firm* — Harness, Dickey & Pierce, P.L.C.

(57) ABSTRACT

A computer-implemented system is provided that enables automated testing of a plurality of mobile devices residing at a monitor site. The system is comprised generally of a test controller in data communication with the plurality of mobile devices. The test controller transmits a test request over a wireless network to each of the plurality of mobile devices, where the test controller communicates via a persistent data channel using a short range communication protocol such as a Bluetooth. Each of the mobile devices is configured with a test agent that is configured to receive the test request from the test controller and execute a test in response to the test request.

7 Claims, 5 Drawing Sheets

US 9,071,989 B2

SYSTEM AND METHODS THAT ENABLE AUTOMATED TESTING OF MOBILE DEVICES AT A REMOTE MONITOR SITE

FIELD

The present disclosure relates to a system and methods that enable automated testing of mobile devices using a persistent data connection between the test controller and the mobile device under test.

BACKGROUND

Remote mobile monitoring solutions enable automated testing of applications running on mobile devices, such as mobile phone or tablet computers. Monitor sites are set up at different geographic locations with each site hosting multiple mobile devices. Tests are scheduled to be executed on these mobile devices depending on various criteria including, network carrier, mobile device model, mobile device type, geographical location etc. The tests may be simple tests such as a "ping test" to test connectivity to a particular server or may be in the form of a test script that would drive an application running on the mobile device. Tests may be initiated by a controller remote from the monitor site and are typically executed by agents running on the mobile device. Statistics pertaining to the performance of the application are collected and reported back to the test controller.

For communication at the monitor site, the test controller and the mobile device under test may be interconnected using a USB connection. There are several limitations with this approach. For example, since power may be provided via the USB port to the mobile device, a mobile device under test may need to be modified for use at the monitor site.

In another approach, the mobile device under test may send SMS messages via a cellular network to the test controller during testing. However, in many test scenarios, there is a need to have a persistent connection between the test controller and the mobile device throughout the life cycle of the test. The persistent connectivity is required for both controlling the test and monitoring results of the test during the test cycle.

Therefore, it is desirable to develop a system that enables automated testing of mobile devices using a persistent data connection with the test controller. This section provides background information related to the present disclosure which is not necessarily prior art.

SUMMARY

A computer-implemented system is provided that enables automated testing of a plurality of mobile devices residing at a monitor site. The system is comprised generally of a test controller in data communication with the plurality of mobile devices. The test controller transmits a test request over a wireless network to each of the plurality of mobile devices, where the test controller communicates via a persistent data channel using a short range communication protocol. Each of the mobile devices is configured with a test agent that is configured to receive the test request from the test controller and execute a test in response to the test request.

A software-implemented method is provided for operating a test agent of a mobile device residing at a monitor site. The method includes: establishing a persistent data channel via a wireless network with a test control device; receiving a request to execute a test; executing a test in response to the test request; and establishing a secondary communication channel via the wireless network with the test controller when communication using the persistent data channel fails, where the secondary communication channel differs from the persistent data channel.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
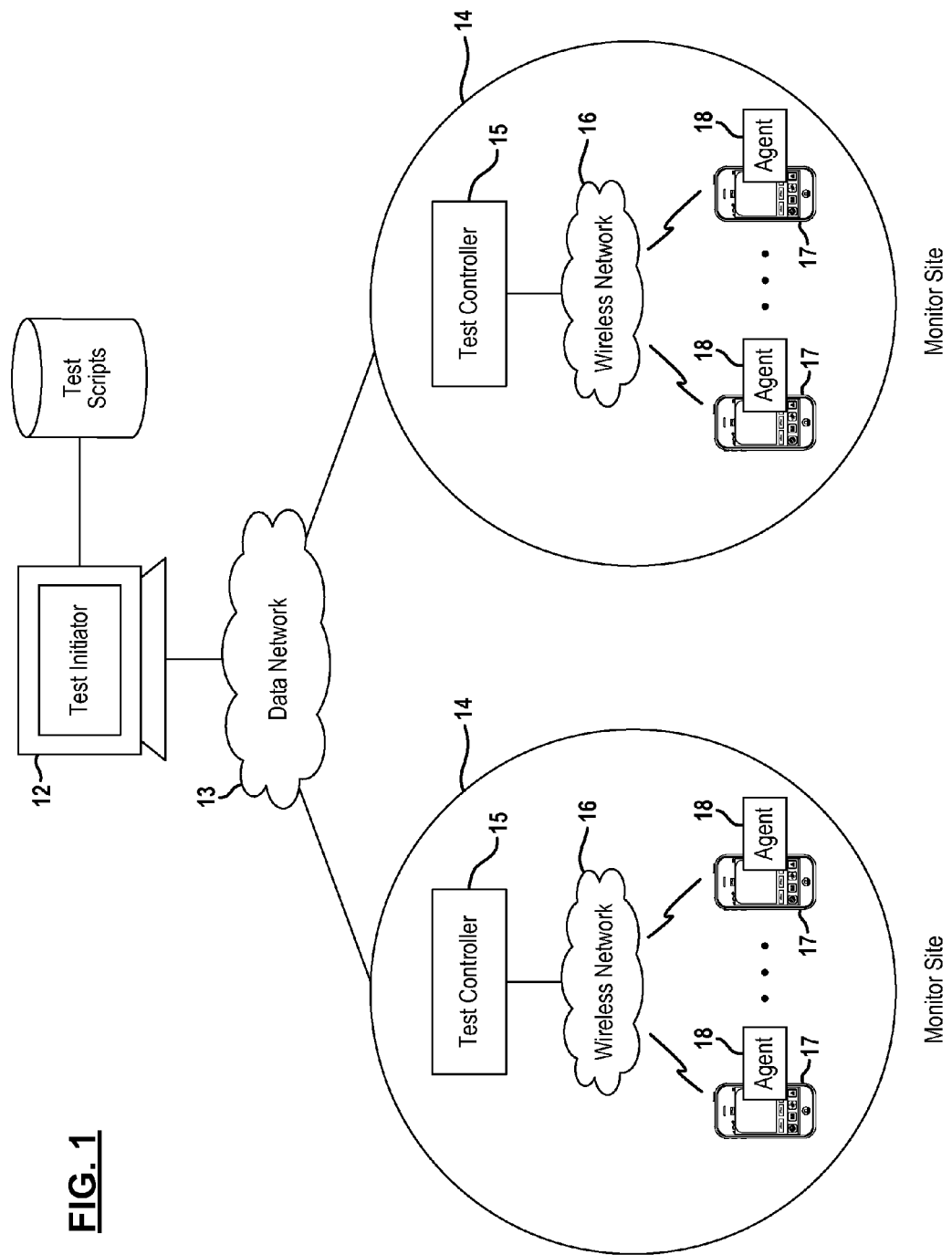
FIG. 1 is a diagram depicting an exemplary system that enables automated testing of mobile devices.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIG. 1 depicts an exemplary computer-implemented system 10 that enables automated testing of a plurality of mobile devices residing at a monitor site. The system is comprised generally to a test initiator 12 interfaced via a data network 13 (e.g., the Internet) with one or more remote monitor sites 14. The test initiator 12 provides a front-end interface for initiating tests, controlling the devices under test and collecting test results from the devices under test. In an exemplary embodiment, the test initiator 12 may be implemented on a personal computer. Monitor sites 14 may be set up at disperse geographic locations depending on the testing requirements. Gomez Synthetic Monitoring tool commercially available from Compuware is a similar testing environment without the extension of mobile devices.

Each monitor site 14 hosts a test controller 15 and a plurality of mobile devices 17. The test controller 15 operates to receive a test request from the test initiator 12 and transmit the test request to one or more of the mobile devices 17. During the course of the test, the test controller 15 may receive other command or control notifications pertaining to the test from the test initiator 12, such as a command to interrupt or terminate the test as well as commands to install an application, uninstall an application, reboot an application etc. These commands are also passed along asynchronously to the applicable mobile device 17. During the course of the test, mobile devices under 17 may also send notifications or messages asynchronously back to the test initiator 12. Likewise, these notifications may be sent to the test controller 15 which in turn forwards the notifications to the test initiator 12. Exemplary mobile devices may include but are not limited to mobile phone, tablet computers, and laptop computers.

Each mobile device 17 is configured with a test agent 18. The test agent 18 is generally responsible for carrying out or executing the test. In one exemplary embodiment, the test agent 18 is pre-configured to perform the steps of the test in response to a test request received from the test controller 15. In another embodiment, the test agent 18 executes steps for the test, where the steps are embodied in the test request received from the test controller 15. In yet another embodiment, the test agent 18 is configured to retrieve a test script upon receipt of the test request. The test script is retrieved from a repository 11 located remote from the monitor site 14, for example, at the site of the test initiator 12. In this case, the test agent 18 may retrieve the test script via the test controller 15 using the persistent data channel. Alternatively, the test agent 18 may retrieve the test script directly from the test initiator 12 using a secondary communication channel such as a WiFi or cellular link. In either case, the test agent performs the test by executing the retrieved test script. Other types of secondary data links are contemplated by this disclosure.

To support ongoing communication during a test, data is preferably transmitted between the test controller 15 and a mobile device 17 using a persistent data channel over a wireless network 16. The test controller 15 is configured to establish the persistent data channel with a given mobile device 17 under test. In an exemplary embodiment, the data is transmitted in accordance with a short range communication protocol, such as the Bluetooth wireless standard. Other types of short range communication protocols may include but are not limited to near field communication and WiFi wireless technology standards. In this context, short range communication between the test controller 15 and the mobile device 17 under test excludes longer range communications such as cellular and satellite based communications.

The test agent 18 is further configured to utilize a secondary communication protocol to communicate with the test controller 15 should communication over the persistent data channel fail or otherwise become unavailable. In an exemplary embodiment, the test agent 18 switches over to a WiFi communication link to communicate with the test controller 15. In the event the WiFi link is unavailable or as another alternative to the persistent data channel, the test agent 18 may also use a short message service (SMS) to communicate test data via a cellular network to the test initiator 11. It is understood that either of these communication channels may be used in support of an ongoing test but do not provide a persistent channel for communicating data to or from a mobile device under test. Moreover, mobile devices are typically configured to use only one of these two channels at a given time, thereby making the other channel unavailable to the test agent 18 for sending notifications.

Figures 2A, 2B:
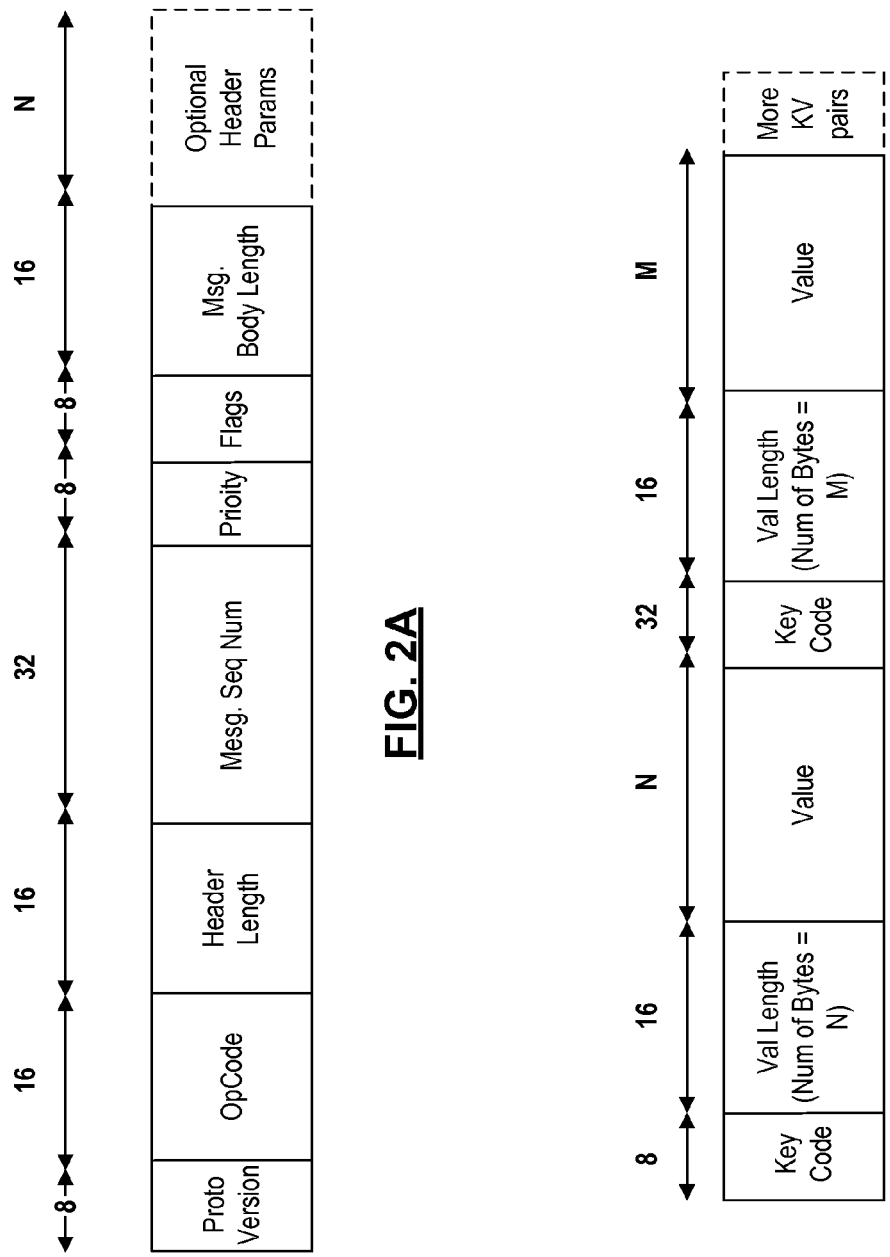
FIGS. 2A and 2B are diagrams of exemplary data structures for a message header and message body, respectively.
Figure 3:
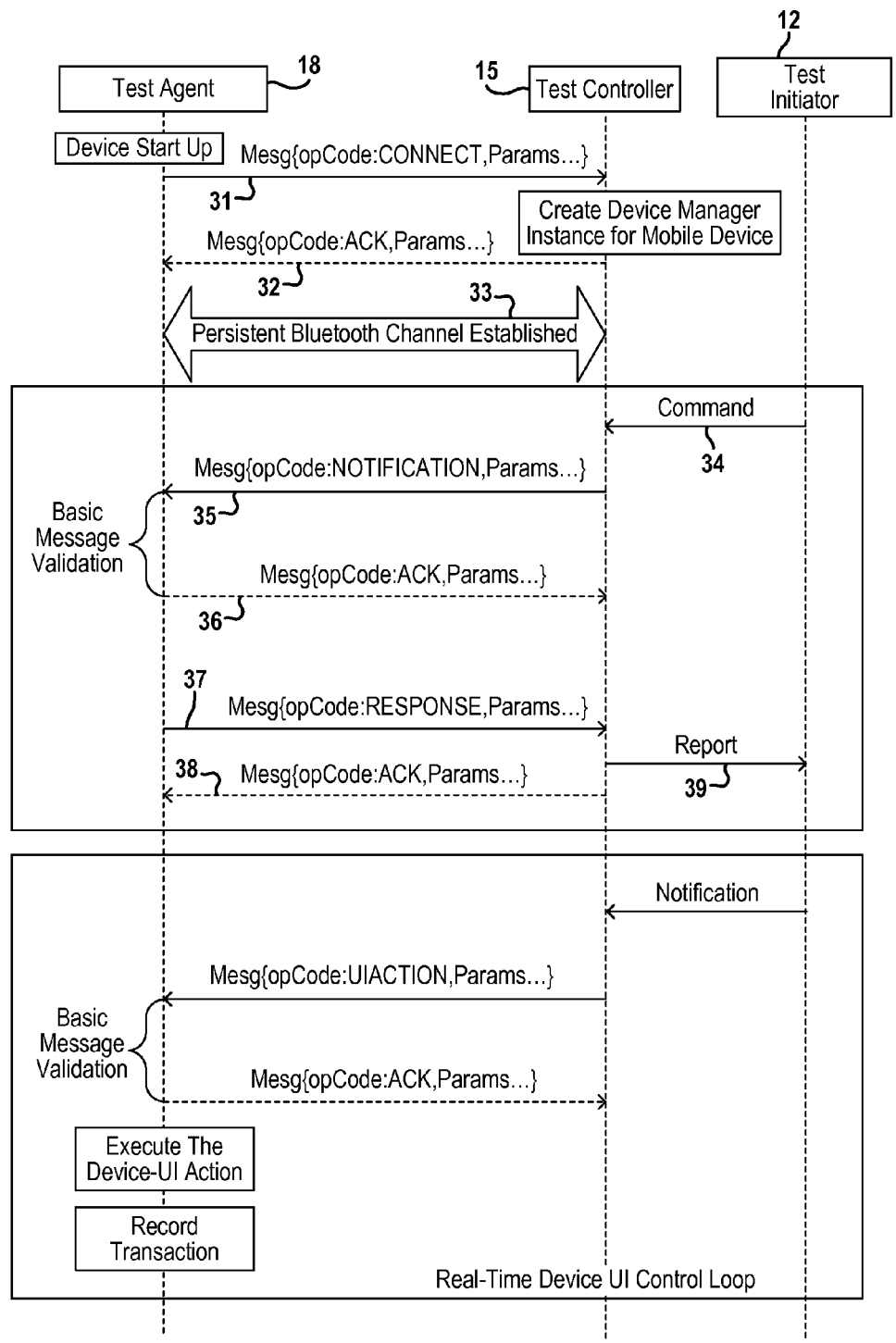
FIG. 3 is a sequence diagram illustrating message sequences between the primary components of the test system.

FIGS. 2A and 2B depicts an exemplary data structure for messages sent in the test system 10. In FIG. 2A, an exemplary data structure is shown for a message header. The message header 21 includes an operational code, a header length, a message sequence number, a message priority, a flag relevant to the operation code, a message body length and an optional field for other header parameters. Examples of the operational codes may include: CN: Connect Request; AK: Acknowledgement Response (to a request); ET: Execute Specific Test Request; FT: Fetch Command Information from Test Server Request; RS: Restart Device Request; ST: Stop ongoing test immediately Request; HC: Health CheckRequest Request; and HR: Response to HC. The message sequence number is used to correlate requests with responses. The sequence number is generated by the sender of a request and a response message must include the sequence number that was specified in the request. In FIG. 2B, an exemplary data structure is shown for a message body. The message body is segmented into n key-value pairs, where each pair includes a key code, a value length and a value field. This message structure is very generic and extensible. The same data structure is used for requests as well as responses. The use of "header options" and "key-value" pairs allows the header and message body to be extended easily without requiring any fundamental changes to the test agent 18. Appropriate message handlers would be responsible for interpreting the key-value pairs and responding appropriately. FIG. 3 further illustrates message sequences between the primary components of the test system 10. Messages are exchanged in accordance with a transport independent notification protocol set forth below. At device startup, the test agent 18 attempts to establish a data channel with the test controller 15. To do so, the test agent 18 sends a connect message as indicated at 31. In response to the connect message, the test controller 15 creates an instance of a device manager object that manages the communication between the device hosting the test agent 18 and the test controller 15. The device manager acknowledges receipt of the connect message at 32 and establishes a data channel at 33 for communicating with the test agent 18.

Once a data channel has been established, a test request as well as other commands associated with the test can be sent as notification messages from the test initiator 12 via the test controller 15 to the test agent 18. In accordance with the notification processing protocol, a command message is sent at 34 from the test initiator to the test controller 15. The command message is in turn relayed as a notification message at 35 to the test agent and acknowledged by the test agent 18 as indicated at 36. The test agent 18 will then act on the command encapsulated in the notification message. In some cases, the test agent 18 will provide a response to the command or otherwise report data to the test initiator 12. Thus, the notification processing protocol further supports a response message indicated at 37 and a corresponding acknowledgement by the test controller 15 as indicated at 38. In this way, messages are communicated in accordance with a transport independent notification protocol that works across any point-to-point transport layer including Bluetooth and TCP/IP.

Figure 4:
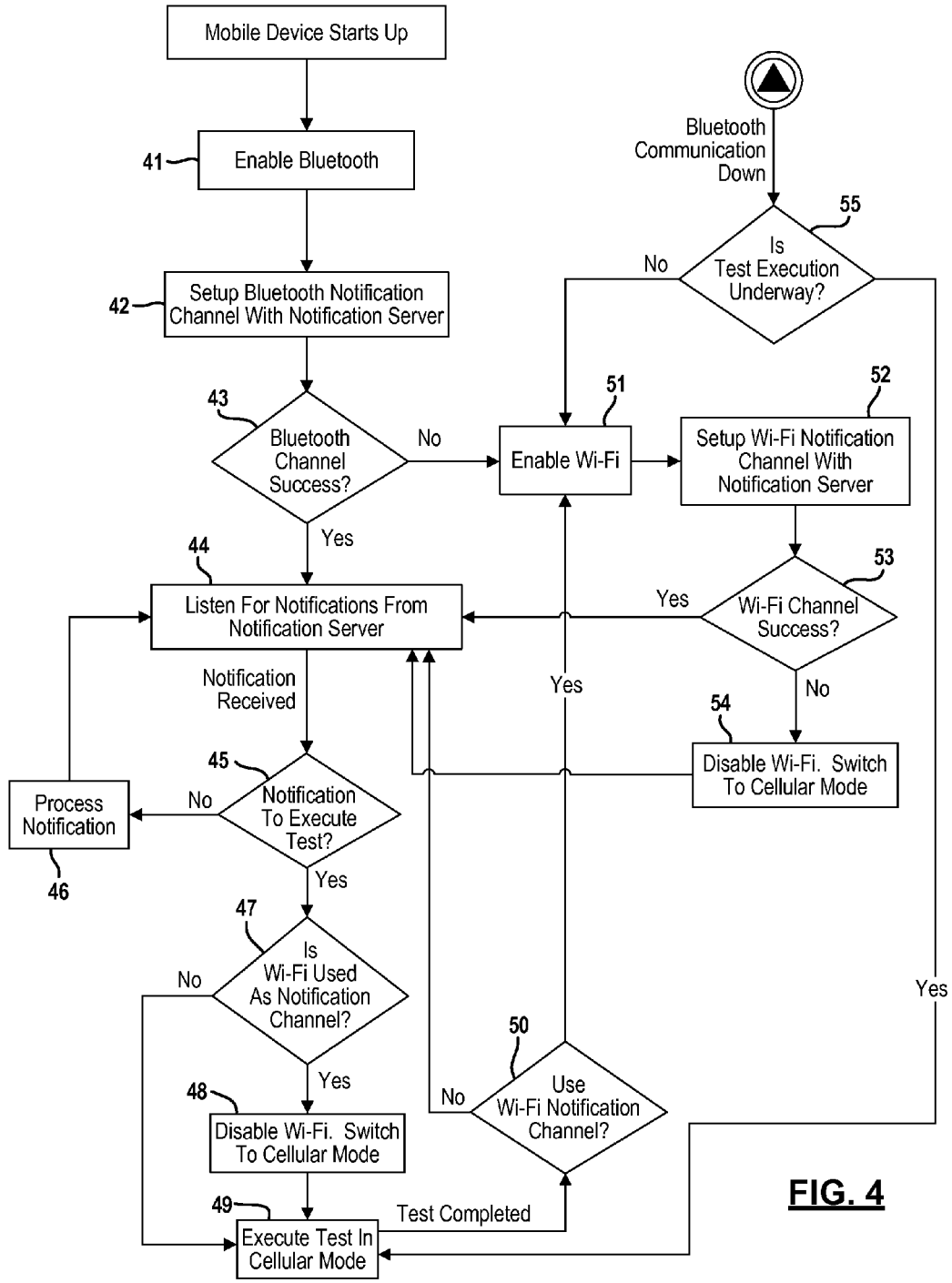
FIG. 4 is a flowchart illustrating the processing steps implemented by the configuration program.

FIG. 4 depicts an exemplary procedure for handling data communication at the test agent 18. Since the persistent data channel is preferably defined in accordance with the Bluetooth wireless standard, the test agent begins at 41 by enabling Bluetooth functionality at device startup. The test agent then sets up a Bluetooth channel at 42 with the test controller 15. When the Bluetooth channel is successfully established, the test agent can listen at 44 for notification messages from the test controller 15. The test agent 18 may also use the Bluetooth channel to send responses or reporting messages to the test controller 15 during a test.

When the establishment of the Bluetooth channel fails, then the test agent 18 attempts to establish a secondary or fallback channel as indicated at 51. In the exemplary embodiment, the fallback channel is implemented using WiFi although other types of data links are contemplated by this disclosure. The test agent 18 first enables WiFi functionality on the device under test at 51 and then sets up a WiFi link at 52 with the test controller 15. Once the WiFi link has been established, the test agent 18 can listen at 44 for notification messages from the test controller 15. As in the case of Bluetooth, the WiFi link enables the test agent 18 to send or receive messages from the test controller 15.

In the event that the Bluetooth and WiFi data links both fail, the test agent 18 will rely upon a cellular link to communicate with either the test controller 15 or the test initiator 12. Thus, the test agent 18 disables the WiFi functionality in favor of the cellular mode as indicated at 54.

Upon receipt of a request to execute a test, the test agent 18 will first determine which communication link is available for communicating with the test controller 15. When the WiFi link is enabled, the test agent 18 will operate to disable the WiFi link at 48. Since the test will likely involve use of the cellular link on the mobile device under test, the WiFi link must be disabled before commencing with the test. The test agent 18 can then execute the test at 49. During and after the test, the test agent 18 can continue to receive and send messages over the Bluetooth channel, if enabled, as indicated at 46. In the event that the Bluetooth channel is disabled, the test agent 18 may also receive and send messages during and after the test using the cellular link.

Once the test is complete, the cellular link may no longer be needed. The test agent 18 can re-establish the communication link being used to communicate with the test controller 15. In the case of the Bluetooth link, no further action is needed as indicated at 50. When the WiFi link is being used as the fallback channel for communicating with the test controller 15, the WiFi link must be re-enabled as indicated at 51. The test agent 18 can resume listening at 44 for notification messages using the WiFi link.

Lastly, the Bluetooth channel may become unavailable for use by the test agent 18. The test agent 18 can detect this condition and make a determination as to whether a test is underway as indicated at 53. When no test is currently ongoing, the test agent will proceed to establish a fallback channel at 51 in the manner described above; otherwise, the test will continue as indicated at 49. It is to be understood that only the relevant steps of the communication protocol are discussed in relation to FIG. 4, but that other software-implemented instructions may be needed to control and manage the overall operation of the test agent 18.

Figure 5:
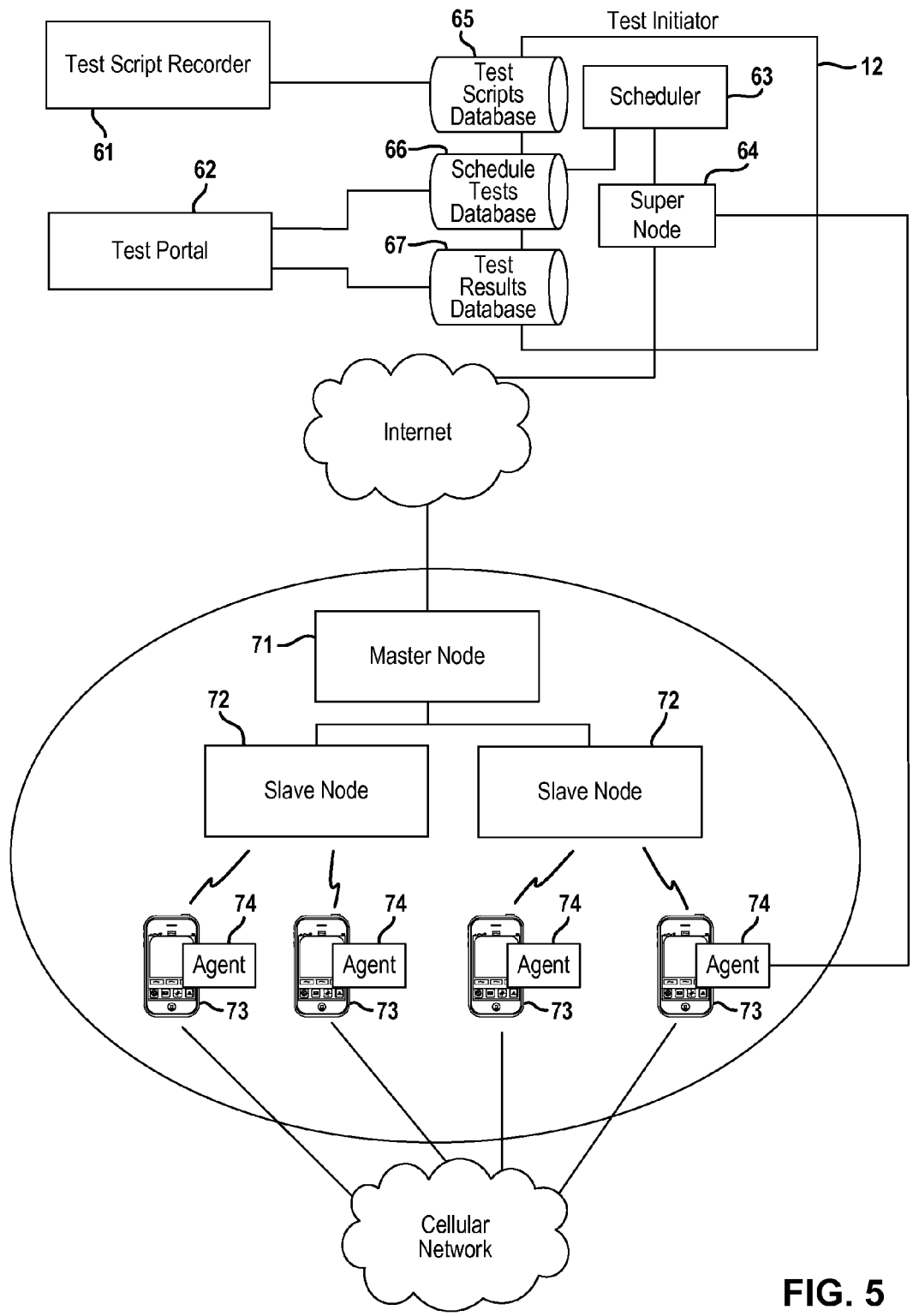
FIG. 5 is a diagram depicting an alternative implementation for a system that automatically tests mobile devices residing a remote monitor sites.

FIG. 5 provides further details regarding the exemplary system 10. A front-end interface for controlling testing is provided at the test initiator site. The interface may be comprised of a test script recorder 61, a test initiator 12 and a test portal 62. The test initiator 12 may include a scheduler 63 and a super node 64. A test script database 65, a scheduled test database 66 and a test results database 67 may also reside at the test initiator site. Each of these components is further described below.

The test script recorder 61 is typically used to record the test script that would be used to drive testing of a mobile application. This may be done by driving the application manually on the mobile device or on a simulator. The recorded test scripts are stored in the test scripts database 65.

From the test portal 62, the user schedules a test to be executed on the mobile device. The test execution may be based on various filter criteria including network carrier, mobile device model, mobile device type, etc. The scheduled tests are stored in scheduled tests database 66. The scheduler 63 picks up the scheduled test from the scheduled tests database 66. The scheduler in turn interfaces with the supernode 64 to initiate execution of the scheduled test. The supernode identifies the monitor site to schedule the tests based on specified filter criteria, e.g., location, and communicates the test request to the appropriate monitor site using the transport independent notification (TIN) protocol. An example would be a HTTP/HTTPS channel established between the supernode and a master node at the monitor site.

In an exemplary embodiment, the monitor site includes a master node 71 and two or more slave nodes 72. The master node 71 may filter the notification request further (e.g., slave nodes may be segregated by carrier type in which case a request for a particular carrier can be targeted to a specific slave node). It should be noted that the hierarchy of master nodes 71 and slave nodes 72 enables a very scalable solution. It is envisioned that a monitor site may have only a single slave node (with no master node or peer slave nodes). Master node 71 communicates the test request to the applicable slave nodes 72 using the generic transport independent notification (TIN) protocol over a persistent connection. An example would be a TCP/IP channel established between the master node 71 and a slave node 72.

Likewise, the slave node 72 may filter the notification request further (e.g., request to run test on iPhones only). Slave node 72 communicates the test request to the mobile phones using the same transport independent notification (TIN) protocol over a persistent Bluetooth channel established between the slave node 72 and a mobile device under test 73. It is envisioned that any other persistent wireless communications technology, such as NFC, can be leveraged for this channel. It should be noted that slave nodes can in turn have more slave nodes. The depth of the hierarchy is a deployment choice and not limited by the architecture. The goal is to have a solution wherein a monitor site is scalable to handle a large number of mobile devices.

The test agent 74 on the mobile phones 73 process the notification request. If the notification request calls for execution of a test, the test agent will switch to a cellular (or WiFi) network in order to perform the test. In certain cases, if the test script is very large to be carried within the payload of a notification request (which may be limited by the transport channel used for the persistent notification channel such as Bluetooth), the test agent 74 may access the test scripts directly from the supernode 64 or a master node 71 via WiFi once it receives the appropriate notification.

The tests are executed by the test agent 74 over cellular network. An example could be an SMS test to compute the round trip latency of an SMS message sent from the device to itself. In another case, the test script could drive a mobile application on the phone which may access the cellular network. Relevant performance metrics are collected by the test agent 74. The test agent 74 reports back the results of the test to the super node 64 via WiFi using the generic TIN protocol over HTTP/HTTPS. Test results are stored in a test results database 67 for subsequent processing. The test results may be presented via the test portal 62.

The system described above has the ability to send asynchronous notifications to the mobile devices which are not limited to its design purpose of testing. In many ways the infrastructure acts as an all-encompassing virtual system that consists of addressable components—mobile devices. The organization of these components through the hierarchy of master, slave nodes, and device manager nodes define a coherent entity. This entity can easily be construed as a network operating system whereby tests are a subset of programs/operations that can be executed on the system. For example, a set of mobile devices can be instructed through asynchronous notifications passed down through the hierarchy to their perspective agents, to upgrade their operating system. To function as a virtual machine, that is, a network operating system for mobile devices—efficient persistent connections throughout the lowest level of the architecture (the device to node connectivity) is required.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A software-implemented method for operating a test agent of a mobile device residing at a monitor site, comprising:
    establishing, by the test agent, a persistent data channel via a wireless network with a test control device, where the test control device and the mobile device reside physically at the monitor site;
    receiving, by the test agent, a request to execute a test via the persistent data channel;
    executing, by the test agent, a test in response to the test request; and
    establishing, by the test agent, a secondary data communication channel with the test controller when communication using the persistent data channel fails, where the secondary data communication channel employs a short range communication protocol that differs from the persistent data channel.

2. The method of claim 1 further comprises establishing the persistent data channel using a short range communication protocol further defined in accordance with Bluetooth wireless technology standard.

3. The method of claim 1 further comprises establishing the secondary communication channel using a short range communication protocol defined in accordance with WiFi wireless technology standard.

4. The method of claim 1 further comprises receiving, by the test agent, a command from the test control device via the persistent data channel during execution of the test, where the command pertains to the test being executed by the test agent.

5. The method of claim 1 further comprises:
    accessing, by the test agent, a cellular network during execution of the test; and
    disabling, by the test agent, the secondary communication channel while accessing the cellular network.

6. The method of claim 1 further comprises establishing, by the test agent, a tertiary communication channel with the test controller when communication using the persistent data channel and the secondary communication channel fails, where the tertiary communication channel is established using a cellular data network.

7. The method of claim 6 further comprises retrieving, by the test agent, a test script using the secondary communication channel from a repository located remote from the monitor site.

* * * * *